United States Patent [19]

Ishihara et al.

[11] 4,162,852

[45] Jul. 31, 1979

[54] METHOD AND DEVICE FOR MEASURING DIOPTERS OF ASTIGMATIC LENSES

[75] Inventors: Taketoshi Ishihara, Sohka; Yosiaki Watanabe, Ageo, both of Japan

[73] Assignee: Tokyo Kogaku Kikai Kabushiki Kaisha, Japan

[21] Appl. No.: 796,595

[22] Filed: May 13, 1977

[30] Foreign Application Priority Data

May 15, 1976 [JP] Japan .................................. 51-55527

[51] Int. Cl.² ............................................. G01B 9/00
[52] U.S. Cl. .................................................. 356/125
[58] Field of Search ............... 356/124, 125, 126, 127; 116/115, 129 A, 129 T

[56] References Cited

U.S. PATENT DOCUMENTS 3,266,368 8/1966 Santinelli ............................. 356/125

Primary Examiner—Conrad J. Clark
Attorney, Agent, or Firm—Stevens, Davis, Miller & Mosher

[57] ABSTRACT

Lens diopter measuring device includes a first and a second diopter scales which have the same but oppositely directed graduations. Correct identification of the diopters of an astigmatic lens can be obtained by bringing the second scale to zero reading at the first focus position and then adjusting the device to the second focus position.

5 Claims, 3 Drawing Figures

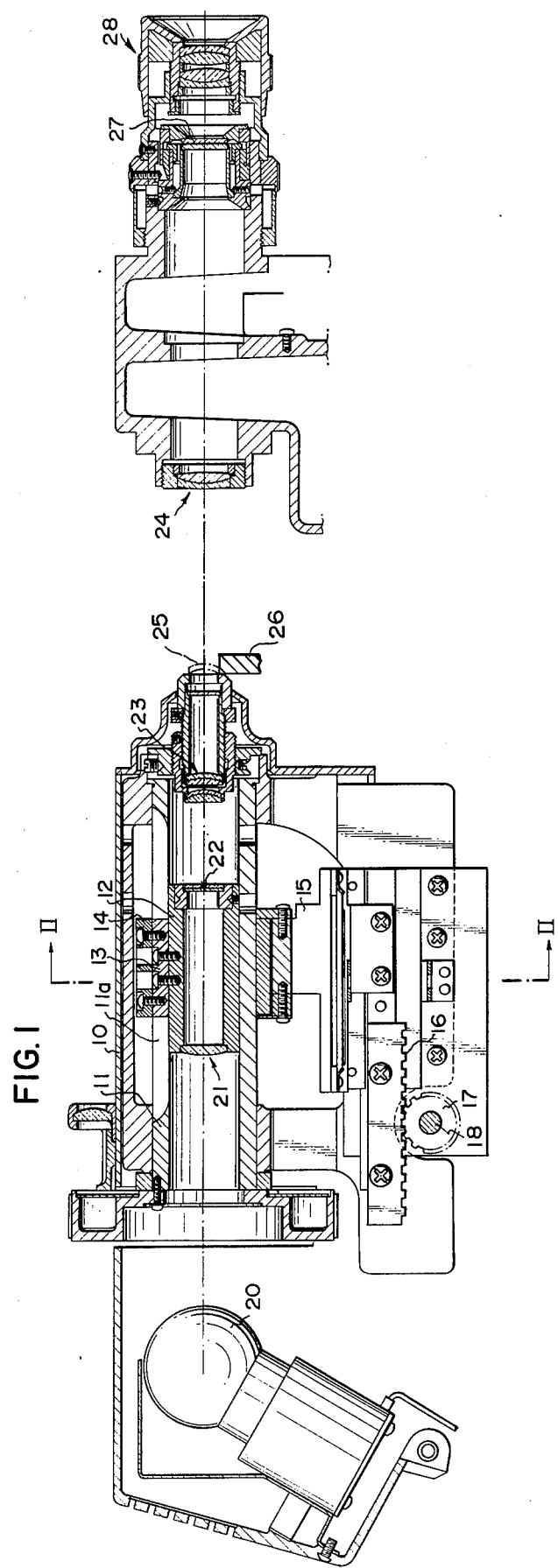

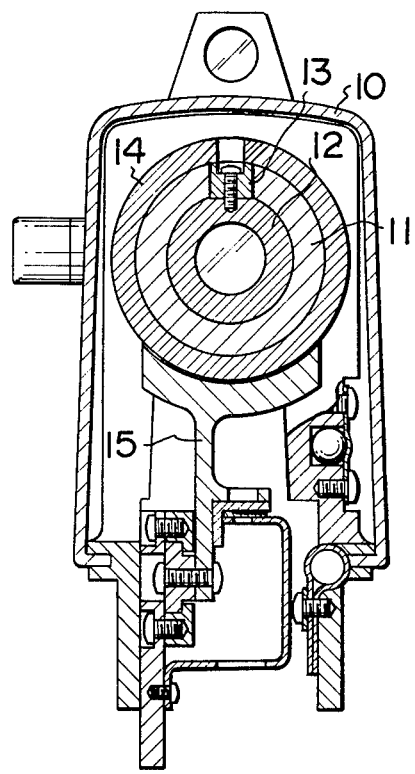
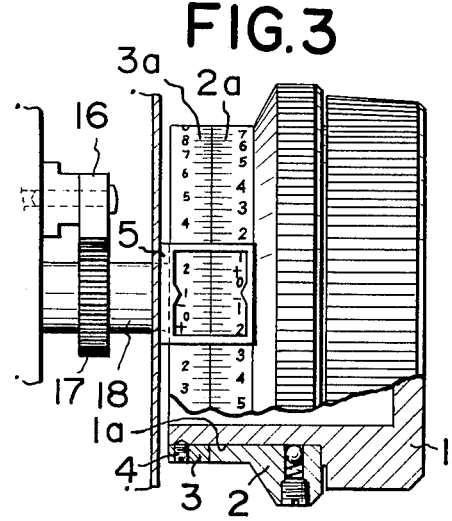

METHOD AND DEVICE FOR MEASURING DIOPTERS OF ASTIGMATIC LENSES

The present invention relates to a method and a device for measuring diopters of astigmatic lenses.

Diopters of astigmatic lenses are measured as in spherical lenses by using lens meters. However, since such astigmatic lenses have two focal distances, two different diopters must be measured. For example, when the measurement shows that the diopters at the first focus is $-1.00^D$ and at the second focus $-1.50^D$, the lens must be identified as having the diopters $(S-1.00^D : C-0.050^D)$. In order to obtain such identification values, one must conduct a calculation $-1.50-(31\ 1.00)=-0.50$. Should an error occur in the calculation step, it would be impossible to obtain a lens of desired diopters.

It is therefore an object of the present invention to provide method and device for measuring diopters of astigmatic lenses without having any possibility of calculation errors.

Another object of the present invention is to provide a method and a device for measuring diopters of astigmatic lenses, wherein the readings of such diopters can be directly obtained by adjusting the device sequentially to the first and second focused positions.

According to the present invention, in order to accomplish the above and other objects, there is provided a device for measuring diopters of astigmatic lenses, which comprises means for carrying a lens to be tested, means for providing a focusing plane, adjusting means for providing a relative axial movement between said lens and said focusing plane, a primary scale adapted to be moved in proportional relation with said adjusting means, and a secondary scale associated with said primary scale so as to be moved therewith when said first scale is moved, said secondary scale being movable with respect to said primary scale by actuating said secondary scale.

According to the method of the present invention, use is made of the aforementioned device. Through actuation of the adjusting means, the relative position of the lens and the focusing plane is set at the first focus position and the secondary scale is moved to the zero position with the primary scale maintained in the position. Thereafter, the adjusting means is again actuated to the second focus position. The readings of the primary and secondary scale at this position will give the desired identification of diopters. For the purpose, the primary and the secondary scales have the same but oppositely directed graduations.

The above and other objects and features of the present invention will become apparent from the following descriptions of a preferred embodiment taking reference to the accompanying drawings, in which:

FIG. 1 is a longitudinal section view of a lens diopter measuring device to which the present invention can be applied;

FIG. 2 is a cross-sectional view taken along the line II—II in FIG. 1; and

FIG. 3 is a fragmentary view of the adjusting device embodying the feature of the present invention.

Referring now to the drawings, particularly to FIGS. 1 and 2, there is shown a lens diopter measuring device comprising a body 10 having a guide tube 11 located therein. Within the guide tube 11, there is axially slidably disposed a tubular member 12 which carries a target 22. The tubular member 12 is connected through a connecting member 13 passing through an axial slot 11a in the tube 11 with a ring 14 which is disposed around the tube 11.

The ring 14 is connected through a bracket 15 with a rack 16 which is in meshing engagement with a pinion 17 formed on a shaft 18. The shaft 18 is in turn connected with an adjusting knob 1. Thus, it will be seen that by rotating the knob 1 the rack 16 is moved through the pinion 17 and consequently the ring 14 and the tubular member 12 are moved axially.

In the body 10, there are also disposed in axial alignment a light source 20, a condenser lens 21, a target 22, a collimator lens 23 and an auxiliary lens 24. Between the lenses 23 and 24, there is removably inserted a lens 25 to be tested by means of a retractable frame 26 or any other suitable means. Thus, the target 22 is projected through the lenses 23, 25 and 24 on the focusing plate 27. The image on the plate 27 is observed through an eye piece 28.

Referring now to FIG. 3, the knob 1 has a cylindrical surface 1a on which an annular member 2 is mounted. The annular member 2 can be rotated with respect to the cylindrical surface by actuating the member 2 directly but when the knob 1 is rotated the member 2 is also rotated together with the knob 1. A further annular member 3 is secured by means of a pin 4 to the cylindrical surface 1a of the knob 1. The annular member 3 has a primary scale 3a on its outer surface and the annular member 2 has a secondary scale 2a on its outer surface. The primary and secondary scales have the same graduations but they are directed in opposite directions. A frame 5 is provided for reading the scales 2a and 3a.

For measuring the lens diopters, a lens 25 to be tested is at first located in position and the knob 1 is actuated so that the target 22 is focused on the plane 27 at a first focal position. The annular member 2 is then actuated so that the reading on the scale becomes zero. The knob 1 is then further actuated so that the target 22 is focused at a second focal position. The readings on the first and second scales 3a and 2a give the identification of the lens diopters.

The invention has thus been shown and described with reference to a preferred embodiment, however, it should be noted that the invention is in no way limited to the details of the illustrated structures but changes and modifications may be made without departing from the scope of the appended claims. For example, the scales may not necessarily be provided on rotatable members but may be on linear slidable members.

We claim:

1. Device for measuring diopters of astigmatic lenses, which comprises means for carrying a lens to be tested, means for providing a focusing plane, actuating means for providing a relative axial movement between said lens and said focusing plane, a primary scale coupled with said actuating means so that it is moved together with said actuating means, and a secondary scale coupled with said actuating means so that it is moveable together with said actuating means and said primary scale when the actuating means is actuated, said secondary scale also being mounted for separate movement when it is actuated relative to the actuating means and the primary scale, said primary and secondary scales having the same but oppositely directed graduations and being positioned in proximity to each other and in opposed relationship so that they can be read together and index means fixed relative to the device for reading the primary and secondary scales.

2. Device in accordance with claim 1 in which said adjusting means comprises a rotatable knob and said first and second scales are provided on said knob.

3. Device in accordance with claim 1 in which said adjusting means includes a rotatable knob which is provided with a cylindrical outer surface, a first annular member secured to the cylindrical surface and having said first scale, a second annular member relatively movably mounted on said cylindrical surface and having said second scale.

4. A device in accordance with claim 1 in which the index means is common to both the scales and is mounted on a stationary part of the device.

5. Method for measuring diopters of astigmatic lenses, by use of a device having means for carrying a lens to be tested, means for providing a focusing plane, actuating means for providing a relative axial movement between said lens and said focusing plane, a primary scale coupled with said actuating means so that it is moved together with said actuating means, and a secondary scale coupled with said actuating means so that it is moveable together with said actuating means and said primary scale when the actuating means is actuated, said secondary scale also being mounted for separate movement when it is actuated relative to the actuating means and the primary scale, said primary and secondary scales having the same but oppositely directed graduations and being positioned in proximity to each other and in opposed relationship so that they can be read together and index means fixed relative to the device for reading the primary and secondary scales comprising the steps of actuating said adjusting means so that said lens is positioned at the first focus position with respect to the focusing plane, actuating the secondary scale so that its reading becomes zero, actuating said adjusting means so that said lens is located at the second focus position with respect to the focusing plane, and reading the first and the second scales.

* * * * *